(12) United States Patent
Keunecke

(10) Patent No.: US 6,242,595 B1
(45) Date of Patent: Jun. 5, 2001

(54) PROCESS FOR THE RECOVERY OF CELLULOSE CARBAMATE

(75) Inventor: Gerhard Keunecke, Pulheim (DE)

(73) Assignee: Lurgi Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/088,582

(22) Filed: Jun. 2, 1998

(30) Foreign Application Priority Data

Sep. 15, 1997 (DE) .............................................. 197 40 455

(51) Int. Cl.[7] .................................. C07H 1/06; C08B 3/00
(52) U.S. Cl. .................................. 536/127; 536/30; 536/32
(58) Field of Search ................................ 536/30, 32, 127

(56) References Cited

U.S. PATENT DOCUMENTS 5,378,827    1/1995    Keunecke ................................ 536/30

FOREIGN PATENT DOCUMENTS 44 17 140 A1    11/1995    (DE) .
0 097 685    6/1986    (EP) .

Primary Examiner—Gary Geist
Assistant Examiner—Everett White
(74) Attorney, Agent, or Firm—McDonnell Boehnen Hulbert & Berghoff

(57) ABSTRACT

The present invention comprises a process for the recovery from a reaction mixture of cellulose carbamate produced by conversion of cellulose with excess urea in an inert organic liquid reaction carrier, wherein the reaction mixture is treated with added water under heat, then the liquid phase is separated as much as possible on a filter, the cellulose carbamate remaining on the filter is washed with water, optionally pre-dried and, if desired, dried and recovered, and the organic reaction carrier is recovered by phase separation from the combined liquids.

5 Claims, 1 Drawing Sheet

PROCESS FOR THE RECOVERY OF CELLULOSE CARBAMATE

BACKGROUND OF THE INVENTION

1. Field of the Invention

The invention relates to a process for the recovery from a reaction mixture of cellulose carbamate produced by conversion of cellulose with excess urea in an inert organic liquid reaction carrier.

2. Description of the Related Art

U.S. Pat. No. 5,378,827 discloses a multi-step process for the production of cellulose carbamate in which the cellulose is mixed with aqueous urea solution, the water portion of the mixture is exchanged for an organic reaction carrier, the conversion to the carbamate is carried out under formation or addition of an inert vaporous or gaseous medium which is led off from the reaction zone, a part of the organic reaction carrier is separated mechanically from the conversion mixture, the remaining mixture is added with aqueous urea solution, the remaining organic reaction carrier removed by distillation, the aqueous cellulose carbamate-containing mixture cooled by lowering its pressure, and the cellulose carbamate separated on a band filter from the aqueous urea solution and washed with water. The financial expense for the separation of the cellulose carbamate and the recovery of urea and reaction carrier is considerable.

According to DE-A 44 17 140, the organic reaction carrier can also be washed out with methanol or ethanol and recovered from the washing filtrate by extraction with water. The remaining extraction mixture can be separated by rectification in alcohol and aqueous urea solution. A disadvantage is that in addition to the reaction carrier, another auxiliary material must be used, namely, alcohol.

In the process of the EP Patent 97 685, the whole organic reaction carrier is separated from the reaction mixture through vacuum distillation and the remaining mixture washed with water. Because of the voluminous nature of the cellulose carbamate, there remains a considerable amount of organic reaction carrier in the cellulose carbamate after the distillation. Also, biuret, the by-product formed, is washed out only with difficulty.

SUMMARY OF THE INVENTION

The present invention comprises a process for the recovery from a reaction mixture of cellulose carbamate produced by conversion of cellulose with excess urea in an inert organic liquid reaction carrier. The process is more economical than those of the prior art. An advantage of the invention is that one can obtain water-wet cellulose carbamate that is practically free from excess urea, biuret, and organic reaction carrier.

The process comprises treating the cellulose carbamate reaction mixture with water under heat, separating the liquid phase from this mixture as much as possible on a filter, washing the cellulose carbamate remaining on the filter with water, which is then optionally pre-dried and/or dried and recovered, and recovering the organic reaction carrier by phase separation from the combined liquids for further use.

The foregoing merely summarizes certain aspects of the invention and is not intended, nor should it be construed, as limiting the invention in any manner. The invention is described in full detail below.

BRIEF DESCRIPTION OF THE DRAWING

The FIGURE is a schematic diagram of an illustrative process according to the invention.

DETAILED DESCRIPTION OF THE INVENTION

Figure 1:
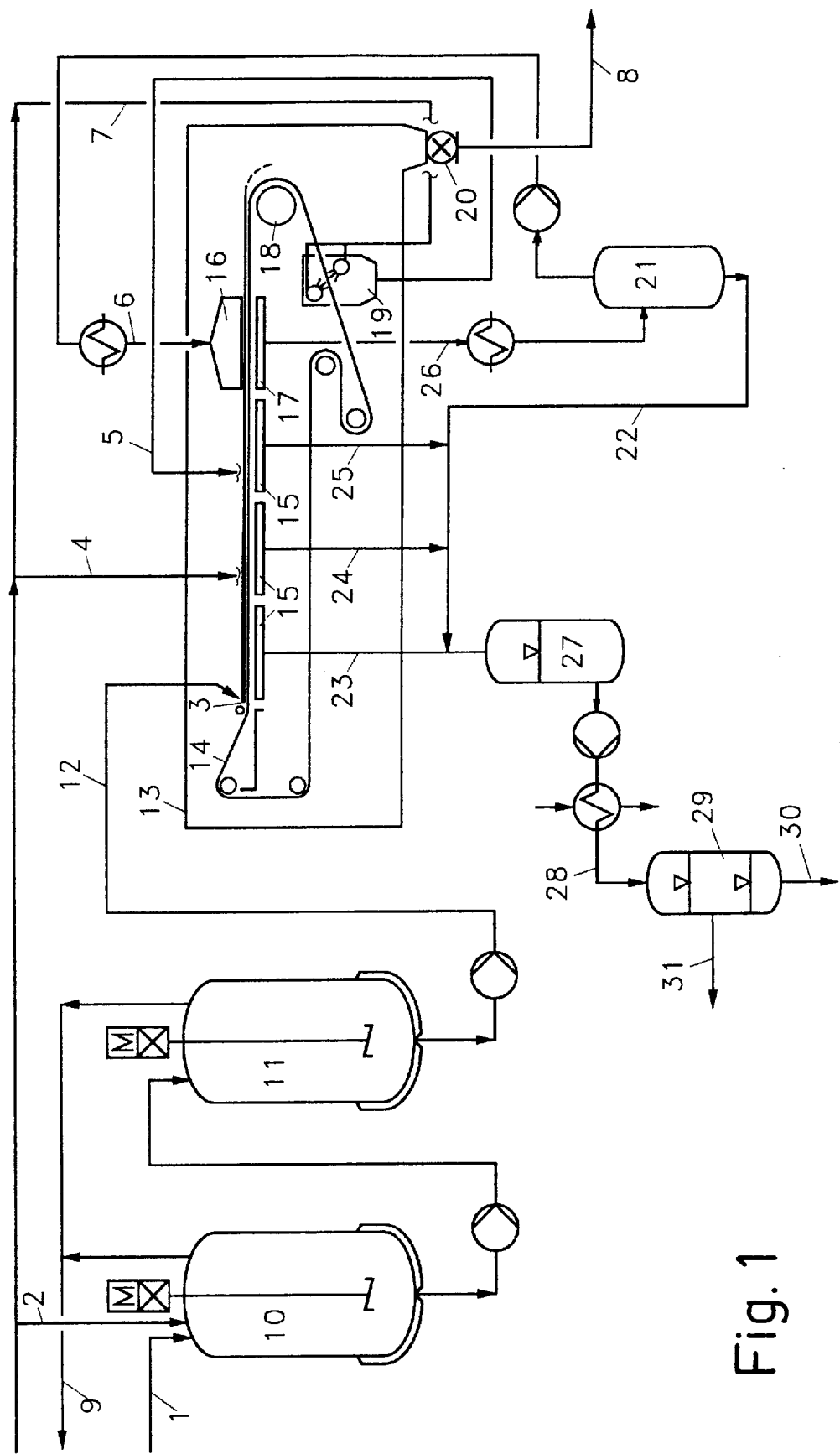

Synthesis of cellulose carbamate can be conducted according to the process of U.S. Pat. No. 5,378,827, DE Patent Applications 196 35 473.0 and 197 15 617.7 or any similar process. In addition to cellulose carbamate, the reaction mixture thereby produced contains an inert organic liquid reaction carrier, unconverted excess urea, and reaction by-products, such as biuret.

The inert organic liquid reaction carrier is generally an aliphatic hydrocarbon, such as linear or branched alkanes, or a hydroaromatic or alkyl aromatic hydrocarbon or a mixture of such compounds with boiling points in the range of 100 to 215° C. at atmospheric pressure. Preferred are mono- di- or trialkylbenzenes, such as xylenes (dimethyl benzenes) or toluene (methyl benzene), or a mixture of them, where the sum of the carbon atoms of the alkyl group(s) lies in the range of 1 to 4, inclusive. Longer-chain alkanes, e.g., a mixture of $C_{11}$-alkanes commercially known as isoundecan, or hydroaromatic hydrocarbons, such as tetralin (1,2,3,4-tetrahdyronaphthalene) or decalin (decahydronaphthalene), with a boiling point of over 185° C. are likewise useful.

According to the present invention, the hot reaction mixture issuing from the last synthesis reactor is mixed with water in a stirrer vessel and stirred under heat or otherwise mixed until the excess unconverted urea embedded in the cellulose carbamate and the reaction byproducts (primarily biuret) have gone into solution in the aqueous phase. The amount of water to be added is preferably 10 to 100 times the amount by weight of the unconverted urea. The temperature in the stirrer vessel is about 70 to 100° C. The temperature is preferably established by the heat exchange of the cold water with the hot reaction mixture, whereby at the same time the temperature of the cellulose carbamate wash water can be raised to the appropriate point. To bring excess urea and reaction by-products into solution, a total of 5 to 120 min, preferably 30 to 90 min are required. In particular, in continuous operation, instead of one stirrer vessel a stirrer vessel cascade, consisting of up to five (preferably two) stirrer vessels in sequence can be used. The dwell time is distributed proportionately among the individual vessels according to the throughput. The temperature in the individual stirrer vessels can be the same or different; likewise, the entire water amount can be added to the first stirrer vessel or distributed among the individual vessels. To prevent explosive vapor mixtures, the stirrer vessels are charged with an inert gas, e.g., nitrogen. The waste vapors are preferably worked up together with the vapors from the synthesis reactor, for example as described in U.S. Pat. No. 5,378,827.

After mixing and treating with water, the reaction mixture is laid evenly on a filter, e.g., a band filter, drum filter, or trough filter, which are commercially available. Upon passage through the first filtration zone, the liquid part (consisting of organic reaction carrier and diluted aqueous urea/biuret solution) is separated as much as possible. The remaining filter cake is then washed (preferably in at least two stages) with 30 to 90° C. (preferably 50 to 90° C.) hot water. The wash water for the last wash stage can be water that had been previously used to wash said used filter or the used portion of said filter freed from the filter cake (e.g., the used portion of a band filter). This way, cellulose carbamate residues adhering to the filter are returned to the process. With several wash stages the temperature of the wash water can be the same or different from one stage to the next. The filtration can take place under vacuum or under pressure. To prevent the dangers of explosive vapor mixtures, the filtration apparatus can be charged with inert gas.

The washed cellulose carbamate, which will generally have a water content of over 50% by weight, can, after removal of the filter, be further processed. Preferably, however, the cellulose carbamate is first pre-dried on the filter after leaving the wash zone and only thereafter further processed. For this purpose, hot inert gas is passed through the filter cake so that residual organic reaction carriers along with water vapor are removed. Then a mild drying can follow. Instead of the pre-drying, the filter cake can also be pressed off. The drying of the cellulose carbamate is continued until a residual moisture content of about 3 to 10% by weight (preferably 6 to 8%) is achieved. The inert gas emerging from pre-drying and/or drying is freed from the condensable components by condensation and re-circulated.

All filtrates, including the organic reaction carrier mixed with water and the wash water, as well as, possibly, the condensate from the drying stage, are combined and worked up together. The combined fluid phases are first cooled to below 50° C. and then through phase separation divided into an organic reaction carrier, which is returned to the process, as well as into a diluted aqueous urea/biuret solution.

The following example is provided for illustrative purposes only and is not intended, nor should it be construed, as limiting the invention in any manner.

EXAMPLE

An exemplary process according to the invention is explained below based on the process scheme of FIG. 1. All parts/h are parts by weight per h.

43 parts by weight/h of 145° C. reaction mixture consisting of 2.37 pts./h cellulose carbamate, 40 pts/h o-xylene (1,2-dimethylbenzene), about 0.30 pts./h of unconverted urea, as well as biuret and other reaction products, were cooled in heat exchange with demineralized water to 100° C. and fed (1) into the first of two stirrer vessels(10) of a stirrer vessel cascade (10 and 11). At the same time, 10 pts/h of about 70° C. demineralized water are introduced (2). The total average dwell time in the stirrer vessel cascade was about 60 min. The waste vapors (9) from the stirrer vessels (10 and 11) were worked up in the cellulose carbamate synthesis together with the vapors from the synthesis reactors. Then the mixture was brought evenly through a conduit (12) to the beginning (3) of the first filter zone of a band filter set (13). Upon passing through the first of three filter zones (15) about 47 pts/h of a mixture (23) of o-xylene and water were separated. The remaining filter cake was washed in the next filter zone (15) with 5 pts/h of 70° C. hot water (4). A further washing with 5 pts/h of 65° C. hot water (5), with which (as described below) the filter band (14) had been previously rinsed (19), followed. Finally the filter cake, consisting of about 2.37 pts/h cellulose carbamate and about 3.6 pts/h water, was passed through a predrying zone (16, 17), where hot nitrogen (6) was passed through it. The condensable components were condensed in the waste gas (26) and separated (21) and the nitrogen re-circulated.

After the pre-drying, the cellulose carbamate, dried to a residual moisture of about 40%, was taken off the filter band (14) at the guide roller (18), carried out over the bucket wheel sluice (20), and led over line (8) to further processing. Thereafter the filter band (14) was rinsed (19) with hot water (7) and the water recirculated (5) to the last washing zone of the filter cake.

The filtrate (23), the wash waters (24 and 25), as well as the condensate (22) from the vessel (21), were combined in the vessel (27) and, after cooling to 40° C., led over line (28) to the separator (29). About 40 pts/h of o-xylene were recovered and led back over the line (31) into the cellulose carbamate synthesis. At the same time, there resulted a biuret-containing, diluted aqueous urea solution (30) that was further processed.

I claim:

1. A process for the recovery of cellulose carbamate from a reaction mixture after its production by conversion of cellulose with excess urea in an inert organic liquid reaction carrier, the process consisting of:

adding water to the reaction mixture after the conversion is complete;

keeping the resulting mixture at about 70 to 100° C. for 5 to 120 min without distilling off said organic reaction carrier, thereby dissolving unconverted urea and reaction by-products in said added water, and then filtering the mixture to separate the liquid phase;

washing the cellulose carbamate remaining on the filter with water of 30 to 90° C.;

optionally pre-drying and/or drying the washed cellulose carbamate with a hot inert gas, and condensing the condensable components of the inert gas that was used to pre-dry and/or dry the cellulose carbamate; and recovering the cellulose carbamate.

2. The process according to claim 1, wherein water is added to the reaction mixture in an amount that is 10 to 100-fold the amount by weight of the urea present in the reaction mixture after the conversion is complete.

3. The process according to claim 1, wherein the cellulose carbamate is washed at least twice with water, the temperature of the water of each wash being independent from the temperature of the water of the other washes.

4. The process according to claim 1, wherein the cellulose carbamate is dried to a residual moisture of about 3 to 10% by weight.

5. A process according to claim 1, wherein the temperature of the wash water is reached through heat exchange with the reaction mixture.

* * * * *